Dec. 8, 1936.  C. T. RAY  2,063,051
TILLAGE IMPLEMENT
Filed July 15, 1932  5 Sheets—Sheet 5
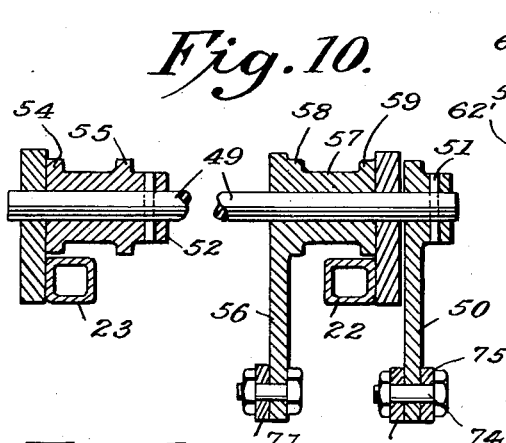
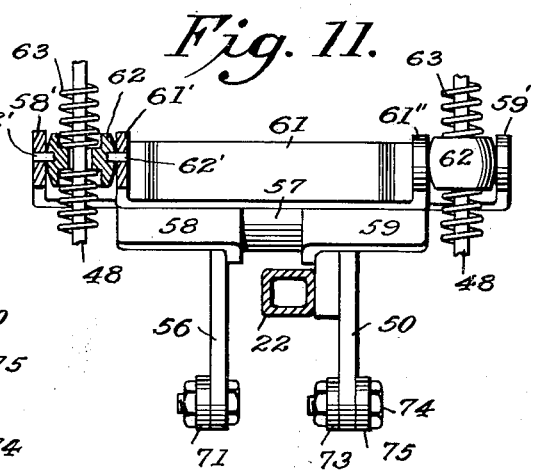
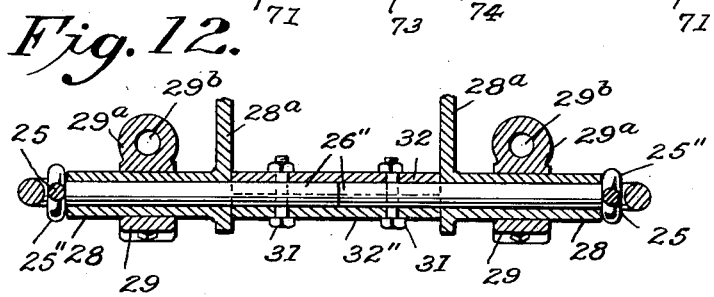
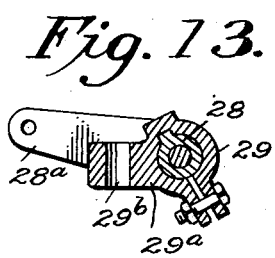
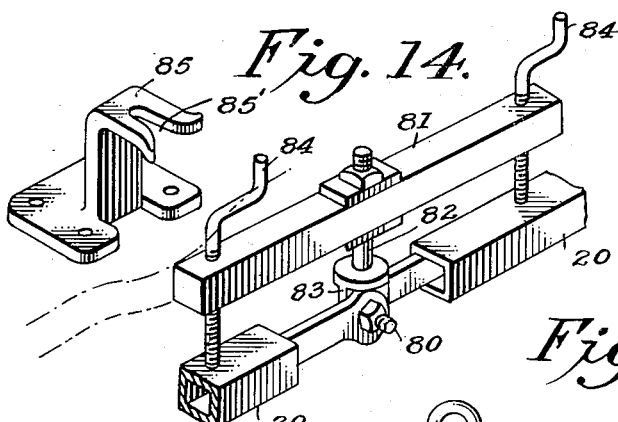
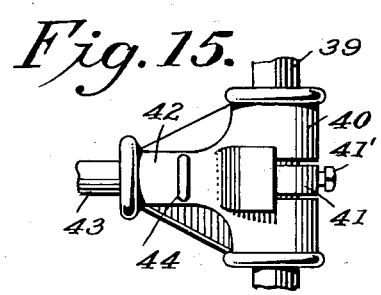
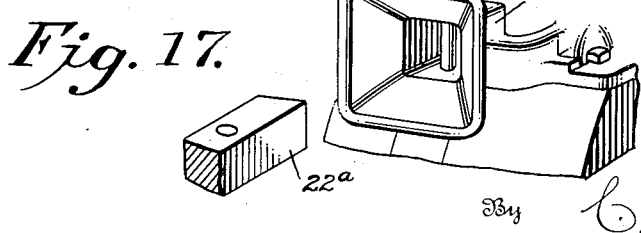
Inventor
Charles T. Ray.

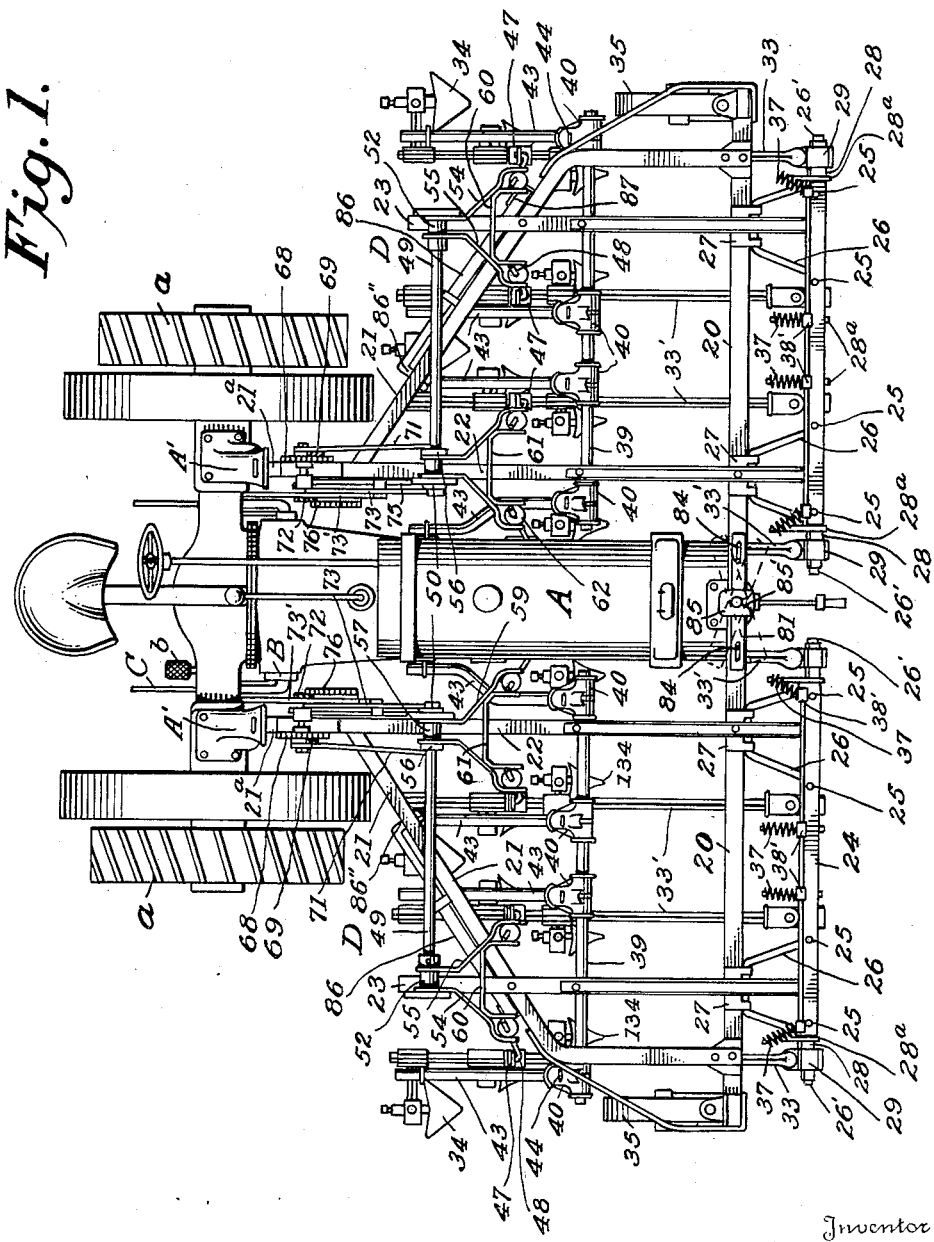

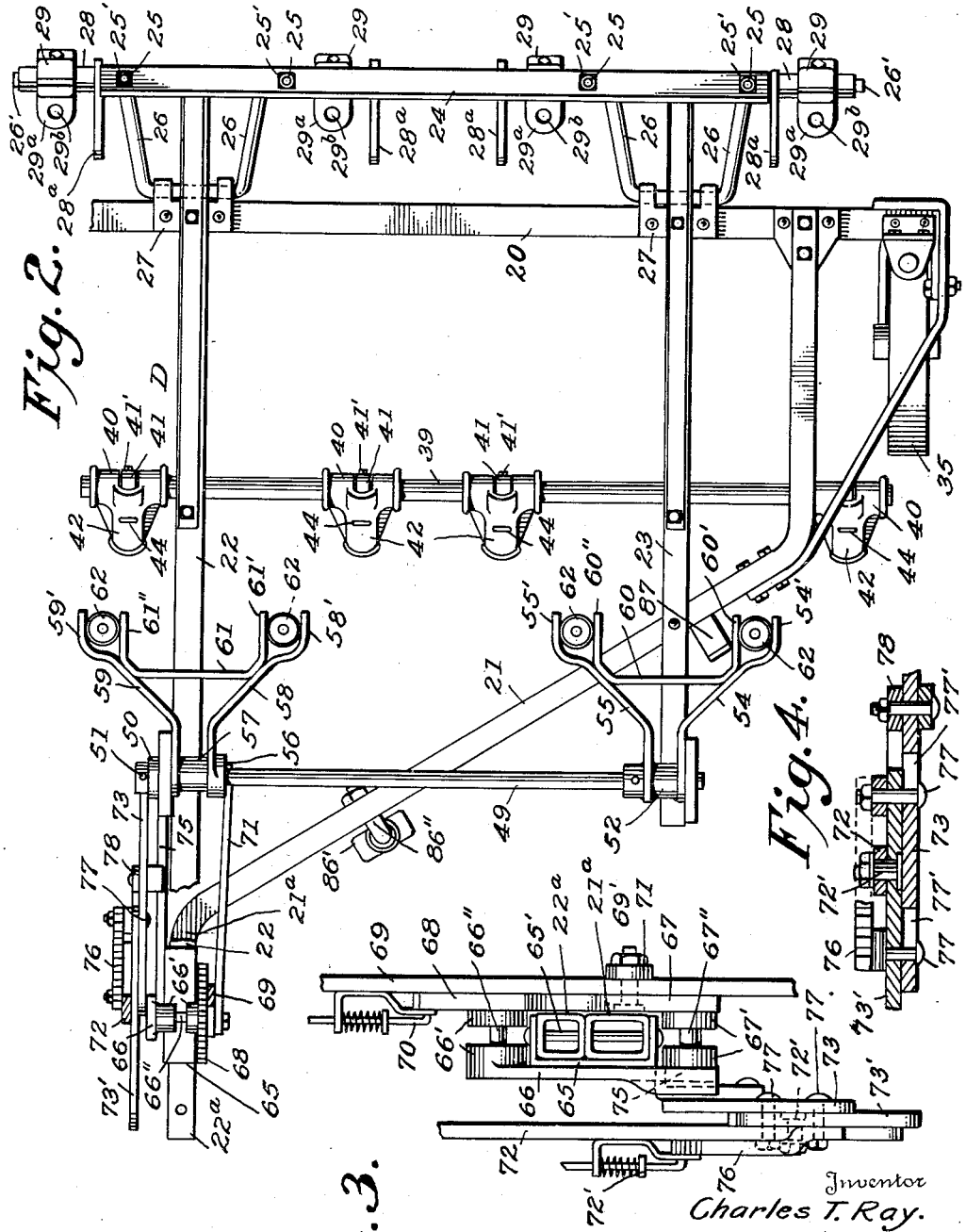

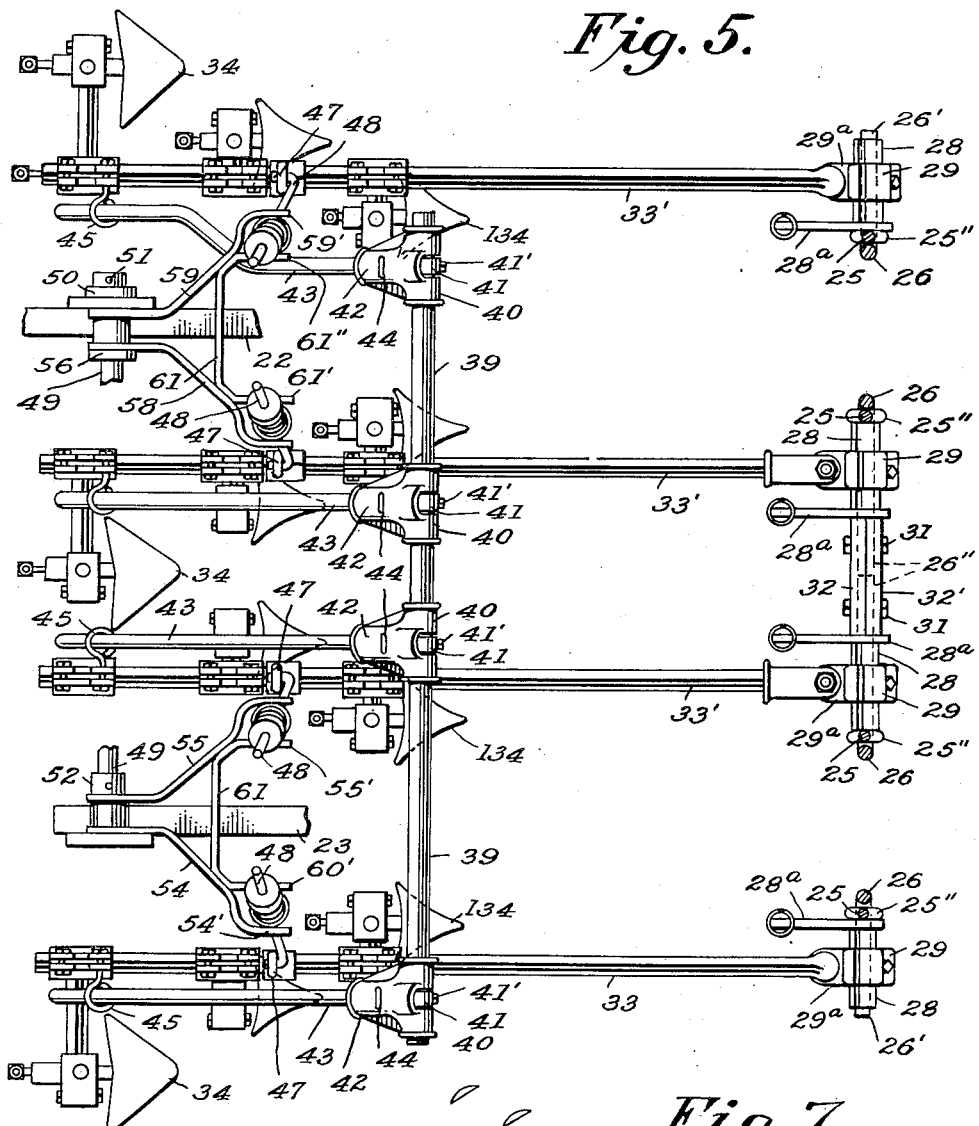
Fig. 5.
Fig. 6.
Fig. 7.
Inventor
Charles T. Ray.
By C. J. Stockman
Attorney

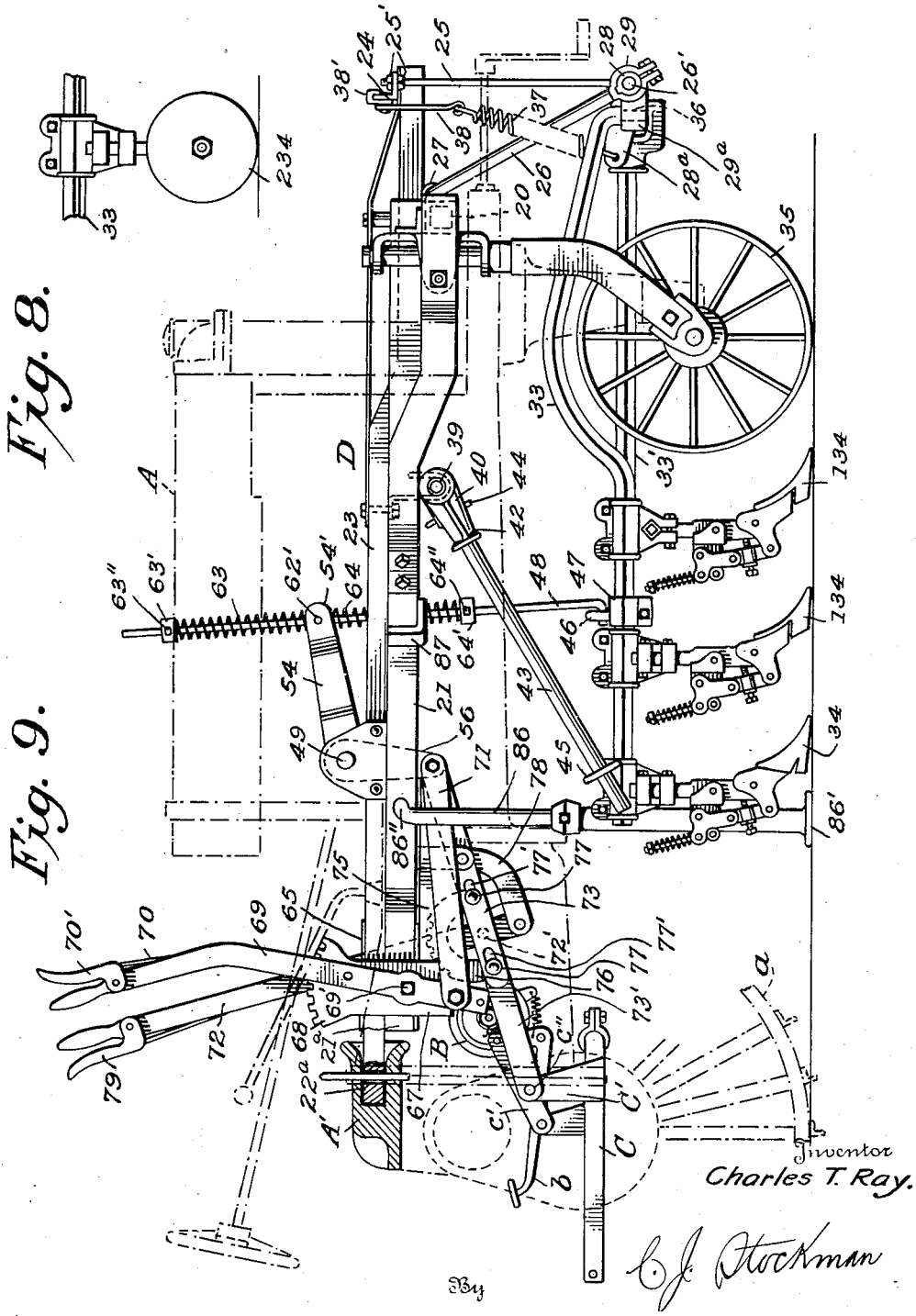

Patented Dec. 8, 1936

2,063,051

UNITED STATES PATENT OFFICE 2,063,051

TILLAGE IMPLEMENT

Charles T. Ray, Louisville, Ky., assignor to B. F. Avery & Sons Company, Louisville, Ky., a corporation of Delaware Application July 15, 1932, Serial No. 622,758

25 Claims. (Cl. 97—47)

In an application for Letters Patent of the United States for improvements in tillage implements, filed July 15, 1932, and numbered serially 622,757, I have shown, described and claimed a combined tractor and agricultural implement designed for row-crop operations of the type in which the parts which act upon the soil are carried by a wheeled frame formed to provide a longitudinal opening into which the tractor may be driven for assemblage with the implement and from which it may be backed out when it is to be used for purposes other than as a propelling means for the implement—means being provided for releasably attaching the tractor and implement to each other. In the application referred to the implement frame is illustrated, described and claimed as comprising two half or side sections arranged on opposite sides of the tractor when in operative relationship with the latter and these half or side sections are so correlated with each other and with the tractor that they may have movement relatively to each other about a horizontal axis and the tractor and each side section also may have movement relatively to each other about a horizontal axis, in following the conformation of the land engaged by the wheels of the side sections and by the wheels of the tractor. The frame of the implement referred to is shown as being provided with means by which "attachments"—as they were called in said application—of different nature are interchangeably connectible therewith and said frame is also shown as being provided with means by which the working position of the attachments may be adjusted and by which spring tension is imposed on the attachments when in their working position. Moreover, the means referred to are shown as including elements connected to a power lift mechanism by which the attachments may be raised or lowered to their working positions upon the land by power derived from an appropriate moving part of the tractor—the adjusting of the working positions, (that is, the setting of the attachments to work at a predetermined depth) and the adjustment of the tension of the spring being accomplished manually through the medium of appropriate operating levers and connections between the levers and the springs and attachments. The aforesaid application for Letters Patent also illustrates and describes planters, stalk cutters and cultivators as attachments interchangeably connectible to the frame of the implement.

The instant application for patent primarily relates to the cultivator in its connection with the frame of the implement and is subsidiary to the application hereinbefore referred to.

In the accompanying drawings illustrating the preferred embodiment of the invention and in which like characters of reference denote corresponding parts in the several views:—

Fig. 1 is a plan view of a four-row row-crop tractor-propelled cultivator embodying this invention and shows the same in operative relationship with the tractor;

Fig. 2 is a plan view of one of the half or side sections of the frame of the implement, and shows the parts to which the cultivating attachments are connected but omits a showing of said attachments;

Fig. 3 is a rear end elevation showing in detail certain of the parts by which the cultivating attachments are set to work at anyone of a plurality of different depths in the soil and by which the tension of the springs which hold the attachments yieldably in their working positions is regulated;

Fig. 4 is a detail representation in section showing the connection of two relatively slidable members which form a link included in the connections to the cultivating attachments;

Fig. 5 is a plan view of one of the half or side sections, together with the cultivating attachments thereof, but omits the frame by which said cultivating attachments are supported;

Figs. 6 and 7 are detail sections merely intended to show different arrangements and styles of openers which may be employed in lieu of shovels, the last-named being preferred in most instances, Fig. 6 showing sweeps and Fig. 7 showing disks;

Fig. 8 is a detail representation showing one of the disks which may be employed in lieu of shovels or sweeps;

Fig. 9 is a side elevation of the cultivator and shows the tractor in operative relationship therewith in dot-and-dash outline;

Fig. 10 is a detail representation in cross section through the sleeves which forms parts of the lifting yoke and also shows the rock shaft upon which said sleeves are mounted, one loosely and the other fixedly, and the crank arms through which movement is transmitted to the rock shaft and to the loose sleeve, respectively;

Fig. 11 is a view of one of the lifting yokes and the pair of crank arms, together with parts of the lifting arms and of the upper and lower springs mounted on each of said arms, and shows the means by which forwardly extending portions of the lifting yokes are operatively connected to the yokes, one of said means being shown in section;

Fig. 12 is a detail sectional representation taken on a line which passes through either arch-shaped member 26 adjacent the spindles 26" at the lower ends of the side limbs of said arch-shaped member, and shows the several sleeves which are mounted on said spindles;

Fig. 13 is a vertical sectional view through one of said sleeves and shows the crank arm 28ª which projects therefrom and the clamp 29 which is fixed to the sleeve;

Fig. 14 is a detail representation, in perspective, showing the means by which the two half sections of the implement frame are connected with each other to have relative pivotal movement upon a horizontal axis and the means by which they may be held against such movement, this figure also showing the bracket which is carried by the tractor in connecting the tractor with the implement;

Fig. 15 is a detail representation particularly intended to show the means by which any one of the hobble bars is connected to the frame of the implement;

Fig 16 is a vertical longitudinal sectional view through the parts shown in Fig. 15; and Fig. 17 is a detail representation of the rear end of the thrust member, forming part of the implement frame and the corresponding socket, forming part of the tractor, through which motion is imparted from the tractor to the implement.

A designates a tractor adapted for row crop operations, said tractor being supported at its rear end by widely spaced ground-engaging wheels $a$, $a$ and at its front end by wheels which are not illustrated, but will be understood to be arranged adjacent each other and near the longitudinal central line of the tractor and toed in toward each other. This tractor is provided with elements of a power lift mechanism which include a clutch indicated at B, Fig. 9, controlled by a pedal $b$, and lifting bail C which is connected to the pedal by a link $c'$ and is also connected to a member of the cultivator setting and regulating means, hereinafter described, at $c''$. The referred to clutch B is of the type, fully shown in my aforesaid application Serial No. 622,757 in which the parts connected therewith are raised and lowered by successive half-revolutions of the clutch and since this particular construction of clutch does not form a part of the instant invention, it is deemed to be unnecessary to illustrate or describe it in detail herein.

The implement frame, as shown in Fig. 1, is composed of two half or side sections, marked D, D, respectively, and each of said half sections includes a transverse member 20 arranged at its forward end and a Z-shaped member 21 whose forward end is connected to the outer end of said transverse member. Each half or side section of the frame also includes a longitudinal thrust member 22 whose forward end is connected to the transverse member 20 and whose rear end rests upon the rear end 21ª of the Z-shaped member 21 and extends rearwardly from the rear extremity of the latter and is loosely received by a socket A' at the corresponding side of the tractor A. The members 20, 21 and 22 form a frame section in which the member 21 acts as a brace between the outer end of the member 20 and the rear end of the member 22, to which it is secured, as hereinafter particularly pointed out. Each side or half section also includes a fourth longitudinal member 23 which is superimposed upon and connected to the member 21 and member 20.

The longitudinal members 22 and 23 extend forwardly of the transverse member 20 and their front ends support an angle iron 24 from which four hangers 25 extend downwardly, one of which hangers is shown in Fig. 9 and the others are indicated in Figs. 1 and 5. These hangers are secured at their upper ends to the angle member 24 by two locking nuts 25', as shown in Fig. 9, and their lower ends are formed with eyes or otherwise to provide bearings 25", as indicated in Fig. 5.

26 designates an arch-shaped member whose upper, closed, end is secured to the transverse member 20 by a saddle 27, as shown in Fig. 2. The lower or free ends of the side arms of this arch-shaped member are bent laterally to form spindles 26' and 26", respectively, which extend through the bearings or eyes 25" in the lower ends of the hangers 25. Assuming that the implement is designed to simultaneously cultivate four rows, as here shown, there will be four hangers and two arch-shaped members on each half or side section of the implement frame and the arch-shaped member or members of each half or side section of the implement will, in any event, straddle the row or rows being cultivated. Sleeves 28 are rotatably mounted on the laterally projecting or spindle portions 26', 26" of each arch-shaped member and each of these sleeves is provided at its inner end with a crank arm 28ª for a purpose hereinafter explained. These crank arms are rigidly connected with their respective sleeves. A clamp 29 is mounted upon each sleeve and is keyed thereto to rotate therewith, as shown best in Figs. 9 and 13. Each clamp is provided with a rearwardly extending lug or projection 29ª formed with an opening 29ᵇ to receive the forward ends of the cultivating attachments and thus provide a means by which a tractive connection is effected between the arch-shaped members 26 and the sleeves 28, through which forward movement of the implement is transmitted to the attachments.

The lateral projections 26" of the two arch-shaped members of each half section of the frame extend through the corresponding sleeves 28 and toward each other from the inner ends of the sleeves, preferably into an abutting relationship with each other, as shown in Fig. 12. Surrounding the portions of these projections 26" which lie between the confronting surfaces of the cranks 28ª at the ends of the sleeves 28 is a spacing sleeve which in practice is preferably formed of complementary semi-cylindrical half sections 32, 32" secured by bolts 31 to each other and to said projections 26". Hence, the two arch-shaped members 26 of each half section of the frame are rigidly secured to each other. In fact, the pair of arch-shaped members 26, the forward portions of the longitudinal frame members 22 and 23, the transverse frame member 24 and the pair of hangers 25 form a rigid frame structure.

In the illustrated embodiment of the invention, each side or half section of the frame carries four cultivator beams the outermost one of which is marked 33 and the other three are marked 33'. These beams carry the ground-working elements which may be in the form of shovels 34, sweeps 134, or disks 234, or any appropriate combination thereof. These ground-working elements are secured in proper relationship upon the respective beams by the usual or any suitable means not necessary herein particularly to set forth. The beams of each half or side section of the implement, with their ground-working elements are relatively so arranged that opposite sides of each of the rows being cultivated will be worked at the same time.

The outer side of each half or side section of the frame of the implement is provided at its forward end with a ground-engaging supporting wheel 35 which is of a castering nature and is connected with the frame by the usual or any suitable means not necessary herein to describe in detail. The outermost beam 33 of each half or side section of the implement is bowed adjacent the corresponding wheel 35 to afford clearance for the swinging movements of the latter. The remaining beams 33' may be straight. Each beam has its forward end formed with a downward projection 36 which extends into the opening 29<sup>b</sup> of the corresponding lug or projection 29<sup>a</sup>. It will be recalled that these lugs or projections extend from clamps 29 which are secured to sleeves 28 rotatably mounted on the laterally extending or spindle portions 26' and 26'' at the free ends of the side arms of the arch-shaped members 26 and hence it will be apparent that the beams have pivotal movement about a horizontal axis at their forward ends. It will also be recalled that the sleeves 28 are provided with crank arms 28<sup>a</sup>. To these crank arms are secured the lower ends of springs 37 whose upper ends, in the illustrated embodiment of the invention are connected to the angle iron frame member 24 through the medium of connectors 38 whose upper ends 38' are hooked over said member 24. It will thus be apparent that provision for quick connection of the beams 33, 33' with the sleeves and their disconnection from the sleeves and also that provision for quick connection of the springs to the frame and sleeves and their disconnection therefrom has been made.

Extending transversely of each half or side section of the frame is a hobble cross bar 39 which is provided at suitable intervals with sleeves 40, there being one sleeve for each cultivator beam. The portion of each sleeve surrounding the shaft 39 is bifurcated to provide a space between its sides and in this space is mounted, upon the shaft, a spacing ring 41 having a set screw 41', or other appropriate element for fastening it to the shaft. It will thus be seen that these sleeves may be relatively adjusted longitudinally of the shaft and fixed against accidental movement from the positions to which they have been respectively adjusted. Each sleeve is formed with a downwardly and rearwardly inclined socket 42 to receive the upper end of a removable "hobble" bar 43 which serves as a connection between the sleeve and the corresponding cultivator beam. The upper ends of these hobble bars are secured in the corresponding sockets 42 by pins 44, or other appropriate fastening elements (see Figs. 15 and 16) and their lower ends are connected to the respective beams by being extended through eyes 45, or the like, clamped upon, or otherwise secured to, said beams, as shown in Fig. 9. The sleeves 40 and the bars 43 form a "hobbling" means by which sidewise swaying movements of the beams in operation are prevented and it will be apparent that by adjusting said sleeves upon their shaft the beams may be set into the positions they should occupy relatively to each other and to the arch-shaped members 26 to whose side arms the forward ends of the beams are connected by the clamp 29 and sleeves 28.

Each beam is also provided at an appropriate place in its length with a keeper 46 (see Fig. 9) which is suitably secured thereto by a clamp 47, or other appropriate fastening means. Each of these keepers receives the lower end of a lifting rod 48. Each of these lifting rods is operatively related to a lifting mechanism and to tensioning springs now to be described.

Each half or side section of the main frame is provided with a rock shaft 49 which extends transversely thereof and is journalled in suitable bearings thereon. Each rock shaft is provided near its inner end—that is, near the end thereof adjacent the tractor when the implement is attached to the tractor—with a crank arm 50 (see Fig. 10) which is secured thereto by a pin 51 or other appropriate fastening device. Near its opposite end the rock shaft is provided with a sleeve 52, secured thereto by a pin or other appropriate fastening device and from which project two arms 54 and 55. A second crank arm 56 is loosely mounted on the rock shaft 49 at the end thereof near the crank 50 and this second crank arm is carried by a sleeve 57, also loose on the shaft and from which a pair of arms 58 and 59, corresponding to the arms 54 and 55, project. The arms 54 and 55 of the sleeve 52 are so correlated as to form a lifting yoke and the arms 58 and 59 projecting from the sleeve 57 are similarly correlated to form a lifting yoke, as shown in Fig. 2. The arms 54 and 55 have their forward ends bent, as shown at 54' and 55', to provide forward extensions which are substantially longitudinal of the implement and said arms are connected to each other by a transverse brace 60 whose opposite ends are bent forwardly, as shown at 60' and 60'', and are spaced from the ends 54' and 55'. The arms 58 and 59 are of the same formation as the arms 54 and 55 and are braced by a member 61 similar to the member 60. The forwardly bent ends of the arms 58, 59 are marked 58', 59' and the forwardly bent ends of the brace 61 are marked 61', 61''. Trunnion rings 62 are mounted in the spaces between the ends 54' and 60', 55' and 60'', 58' and 61', and 59' and 61'' of the lifting yokes, each trunnion ring having horizontal pivots 62' projecting from its opposite sides and engaging said ends of the yokes. The trunnion rings and their association with the yoke arms 58 and 59 and brace member 61 are shown in Fig. 11. It will be understood that this arrangement is duplicated in relation to arms 54, 55 and brace 60. The respective lifting arms 48 extend through said trunnion rings and each is provided with a spring 63 arranged above the corresponding trunnion ring and with a second spring 64 arranged below said trunnion ring, as shown best in Fig. 9. The spring 63 has its upper end engaged with a collar 63' which forms an abutment therefor and is adjustable longitudinally of the lifting rod 48 and is fixed in its adjusted position by a fastening bolt 63'', or the like; and the spring 64 has its lower end engaged with a similar collar 64' which is longitudinally adjustable on the rod 48 and is fixed in its adjusted position by a fastening bolt 64'', or the like.

It will be recalled that the rear end 22<sup>a</sup> of the longitudinal thrust member 22 is superimposed upon and extends rearwardly beyond the rear end 21<sup>a</sup> of the Z-shaped member 21. These rear ends, as shown in Fig. 3, extend through a holder 65, of channel shape, and are secured therein by a bolt 65'. 66 and 67 designate members which complementarily form a slide. These members are provided with bosses 66' above the holder 65 and with similar bosses 67' below said holder; and bolts 66" and 67" extend through the bosses and rigidly secure the members 66 and 67 to each other into a unitary construction. The member 67 has its upper end formed to provide a toothed segment 68.

69 designates a manually operable lever which is fulcrumed, at 69', to the slide member 67 and is provided with a spring latch 70 to engage in anyone of the teeth of the segment 68, said latch 70 being connected with a grip member 70' by which it is released from the teeth engaged thereby. The lever 69 is connected by a link 71 with the crank arm 56 of the loose sleeve 57 and hence when moved forward or rearward correspondingly rocks said sleeve upon the shaft 49 and raises or lowers the yoke-arms 58 and 59, according to the direction of movement given said lever.

72 designates a second manually operable lever. This lever, as shown best in Fig. 4, is connected by a pivot 72' with one member 73' of a longitudinally extensible link, whose other member is marked 73. The forward end of the link-member 73 is connected to the fast crank 50 of the shaft 49 by a pivot 74. The member 66 of the slide is provided with an arm 75 which is preferably integral therewith and is connected to the fast crank 50 by the before mentioned pivot 74.

The link-member 73', to which the lever 72 is pivoted is provided with a toothed segment 76 and is connected with the link-member 73 by pins 77 which traverse slots 77', and the lower end of the lever 72 is connected with said link-member 73 by a link 78. The lever 72 is provided with a spring-pressed latch 72' which cooperates with the segment 76 in setting said lever in selected position. Fig. 9 shows a grip member 79 which is connected to the latch 72' and is operated to move said latch and thereby release the lever from the segment 76. It will be understood that when said lever has been thus released, it may be moved forward or rearward and in its movement will correspondingly lengthen or shorten the link composed of the members 73 and 73'.

The rear end of the member 73' is adapted to be connected, as shown at c", to the bail C forming part of the power lift mechanism, the said bail having an upward projection C' to the upper end of which the pivotal connection referred to is made.

It will be noticed that the operating levers 69 and 72 are conveniently arranged to be operated by the operative on the seat of the tractor and it will be understood that each half or side section of the implement is provided with said levers 69, 72 and their adjunctive elements.

In my companion application, Ser. No. 622,-757, hereinbefore referred to, the two side or half sections of the implement frame are shown and described as having their forward transverse members pivotally connected with each other, to permit relative up and down movements thereof and special means are illustrated and described in said application for holding said half or side sections against relative movement and for supporting them from the ground, when the implement frame is not assembled with the tractor. The particular means by which the two side or half sections of the frame are locked to each other against relative movement, at will, are claimed, broadly and specifically in its combinative relationship with the half or side sections of the implement frame in the said application and hence while employed in the instant application need not be described in detail herein. It is shown in detail in Fig. 14 and it is sufficient to state that 80 designates the pivot about which said members have relative movement upon a horizontal axis; 81 designates a bridging member which is supported at the upper end of the stem 82 of a hanger having a member 83 which carries the pivot 80; and 84, 84 designate devices mounted at opposite ends of the bridging member 81 and adjustable into and out of engagement with the respective transverse members 20. By adjusting these members 84 into and out of engagement with the respective members 20, the latter will be held against and freed from relative movement.

In my companion application Ser. No. 622,757, I have shown and described a bracket having a forwardly extending member formed with a forwardly open slot adapted to receive the stem 82, said bracket being carried by the forward end of the tractor and serving as a means for connecting the implement frame to the tractor. The bracket referred to is shown in Fig. 14 in which its forwardly extending member is marked 85 and the slot therein is marked 85'. 86, Fig. 9, designates a longitudinally extensible prop whose lower end is provided with a foot-piece 86' and whose upper end is pivoted at 86" to the frame. Each half or side section of the frame is provided with one of these props to support the same when the tractor is not connected to the cultivator. When the tractor is connected to the culivator, the prop is raised about its pivot at 86" and is held in its raised position within a holding 87.

In the operation of the cultivator the springs 37 and 63 cooperates to counterbalance the weight of the cultivator beams and their ground-working elements and overcome any tendency of said elements to dig into the ground to a depth greater than that for which they have been set: while the springs 64 act to hold the cultivating elements at their prescribed depth in the event that said elements strike a hard piece of ground. It will thus be noted that a floating action is imparted to these attachments, which is very desirable in cultivating implements.

The depth of penetration of the soil-working elements is regulated as follows: adjustment of the lever 72 of either half or side section B of the implement, while said lever is latched to its segment 76 moves the outer link-member 73 connected to said lever correspondingly and imparts movement to the fast crank arm 50 to which said link-member is connected. This movement is transmitted through the rock shaft 49 to the side arms 54, 55 of the lifting yoke fixed on the outer end of said shaft, and is also transmitted to the side arms 58, 59 of the lifting yoke loose on said rock shaft through the corresponding slide arm 75, slide composed of the connected side members 66 and 67, lever 69, link 71 and loose crank arm 56. By thus operating either lever 72 all of the lifting rods 48 mounted upon the corresponding half section or side of the frame of the implement are correspondingly moved with their springs 63 and 64. If adjustment of the depth of penetration of the attachments which cultivate either of the inner rows, is desired, such adjustment may be effected by movement of the corresponding levers 69 since these levers are capable of movement about their respective fulcrums, independently of the levers 72, and when thus moved operate through the links 71 to move the arms 58, 59 of the loose lifting yoke correspondingly.

It will be understood that rearward movement given the upper ends of levers 69 and 72 causes downward movement of the forward ends of the yoke arms and that this downward movement is transmitted to the cultivator beams through the springs 64, abutments 64', and lifting rods 48. Conversely, forward movement of the upper ends of said levers moves the forward ends of the yoke arms in an upward direction and lifts the rods 48, and hence the cultivator beams, through the springs 63 and the abutments 63'. It will also be understood that since all the cultivator beams may be thus simultaneously set to cause their cultivating elements to work at the same predetermined depth, or by adjustment of levers 69 only, certain of said beams may be set relatively to others, and since by adjustment of the levers 72 the amount of compression or tension in the springs 63 and 64 is correspondingly changed, full provision for relative as well as simultaneous adjustment of the beams as to their position and also the pressure imposed thereon, is made.

Having thus described the invention what I believe to be new and desire to secure by Letters Patent, is:—

1. A multi-row cultivator comprising a main frame formed to provide two side sections spaced apart longitudinally to receive a tractor between them and whose forward ends are provided with means for connecting them to each other and to the forward end of the frame said tractor to have movement about a common substantially horizontal axis relatively to each other and to the tractor, each of said frame sections also having a supporting wheel at its outer side, a series of gangs of cultivating devices carried by said sections and relatively arranged to cultivate both sides of a plurality of rows at each side of the tractor, simultaneously, each of said frame sections having depth adjusting means for the several gangs of cultivating devices and each also having means adapted for connection to a tractor-operated power means for raising or lowering the several gangs by power derived from the tractor.

2. A multi-row cultivator comprising a main frame formed to provide two side sections spaced apart longitudinally to receive a tractor between them and each provided at its outer side with a ground-engaging supporting means, a series of gangs of cultivating devices carried by said sections and relatively arranged simultaneously to cultivate both sides of each of a plurality of crop rows at each side of the tractor and means forming a direct connection of said side sections of the main frame with each other and with the frame of the tractor, said means including a horizontal pivot about which said sections have up and down movements relatively to each other and to the tractor upon a common substantially horizontal axis.

3. A cultivator comprising a main frame formed to provide two side sections spaced apart longitudinally to receive a tractor between them and each provided at its outer side with a ground-engaging supporting means, and a pair of gangs of cultivating devices carried by each of said sections: said sections respectively having transverse members which are fixedly connected thereto whose inner ends are in an overlapping relation and arranged to be positioned forward of the front end of the tractor and are pivotally mounted to have movement about a common substantially horizontal axis relatively to each other and to the tractor.

4. A cultivator comprising a main frame formed to provide two side sections spaced apart longitudinally to receive a tractor between them and each provided at its outer side with a ground-engaging supporting means, and a pair of gangs of cultivating devices carried by each of said sections: said sections respectively having their inner sides provided with longitudinal thrust members whose inner ends are operatively engageable with the tractor by forward movement of the tractor relatively to the frame and their forward ends provided with transverse members whose inner ends are in an overlapping relation and arranged to be positioned forward of the front end of the tractor and are pivotally mounted to have movement about a common substantially horizontal axis relatively to each other and to the tractor.

5. A cultivator comprising two separate frame sections spaced apart longitudinally to receive a tractor between them and each provided at its outer side with a ground-engaging supporting means, and a pair of gangs of cultivating devices carried by each of said sections: said sections respectively having transverse members whose inner ends are in an overlapping relation and arranged to be positioned forward of the front end of the tractor together with means for connecting their overlapping ends to each other and to the tractor, including a plurality of members one of which forms a substantially horizontal pivot common to both frame sections and the other of which forms a substantially vertical thrust member arranged to be engaged by the forward end of the tractor about midway the width of the latter, and said frame sections also having longitudinal thrust members extending rearwardly at opposite sides of the first mentioned thrust member and whose rear ends are respectively engageable by the tractor at places rearward of the front end of the latter.

6. A multi-row cultivator comprising a plurality of pairs of gangs of cultivating devices and a main frame formed to provide two side sections which respectively support one pair of said gangs; said sections being spaced apart longitudinally to receive a tractor between them and each provided at its outer side with a ground-engaging supporting means and at its front end with a transversely extending frame member together with means connecting the inner ends of their transverse members to each other and to the tractor, to permit movement of the members relatively to each other and to the tractor, including a member about which the sections have relative up and down movements upon a common axis and a member operatively engageable with the tractor to transmit movement to the frame from said tractor.

7. A multi-row cultivator comprising a main frame formed to provide two side sections spaced apart longitudinally to receive a tractor between them, each of said sections having a supporting wheel at its outer side and each also having a thrust member which extends longitudinally thereof and whose inner end is operatively engageable with the tractor by forward movement of the tractor relatively to the frame and through which power which propels the cultivator is transmitted to the cultivator, means connecting the side sections of the main frame with each other and with the front end of the tractor, said means including a member about which said sections have movement upon a common horizontal axis relatively to each other and to the tractor, and a plurality of gangs of cultivating devices carried by each of said side sections and relatively positioned to simultaneously cultivate both sides of a plurality of rows at each side of the tractor.

8. A multi-row cultivator comprising a main frame formed to provide two side sections spaced apart longitudinally to receive a tractor between them and each provided with a supporting wheel at its outer side, said sections including forward members whose inner ends are in an overlapping relation and are pivotally connected with each other to have relative movement about a common horizontal axis and also including a thrust member which extends longitudinally thereof and is adapted for connection at its rear end with the tractor and through which power which propels the cultivator is transmitted from said tractor to the cultivator, means for connecting the forward end of the frame to the forward end of the tractor, a plurality of gangs of cultivating devices carried by each of said side sections of the frame and positioned to simultaneously cultivate both sides of a plurality of crop rows at each side of the tractor, means for adjusting the depth of penetration of the gangs of cultivating devices and for holding them resiliently in their adjusted positions, and means for raising or lowering said gangs from or into working position by power derived from the tractor.

9. A multi-row cultivator comprising a main frame formed to provide two side sections spaced apart longitudinally to receive a tractor between them and each provided with a supporting wheel at its outer side, said sections including forward members whose inner ends are in an overlapping relation and are pivotally connected with each other to have relative movement about a common substantially horizontal axis, means adjustable relatively to said forward members into and out of restraining relation therewith, means for connecting the main frame to a tractor, a series of gangs of cultivating devices carried by each of said side sections of the frame and relatively positioned simultaneously to cultivate both sides of a plurality of crop rows at each side of the tractor, means for adjusting the depth of penetration of the gangs of cultivating devices and for holding them resiliently in their adjusted positions, and means for raising and lowering said gangs from or into operative position by power derived from the tractor.

10. A multi-row cultivator comprising a main frame formed to provide two side sections spaced apart longitudinally to receive a tractor between them and including means for connecting them to each other and to said tractor, each of said side sections also having a supporting wheel at its outer side, a series of sleeves, supporting means projecting downward from the forward ends of the side sections and upon which said sleeves are respectively mounted to have rotative movement about horizontal axes, tensioning springs respectively connected to said sleeves, a series of gangs of cultivating devices whose forward ends have vertical pivotal connection with said sleeves, respectively, and a series of stationarily mounted members operatively related to the frame and to the respective gangs to prevent movement of the latter about their vertical axes while permitting movement of the same, with the sleeves, about horizontal axes, at all times in the operation of the cultivator.

11. A cultivator including a main frame, a supporting means projecting downward therefrom; a sleeve rotatively mounted upon the lower end of said supporting means and provided with an arm projecting therefrom, a spring whose upper end is connected to the main frame and whose lower end is connected to said arm, means mounted upon the sleeve to rotate therewith and provided with a lug or projection extending therefrom, a cultivator beam whose forward end is journaled in said opening to have pivotal movement relatively thereto upon a vertical axis and a member stationarily mounted upon the frame and connected to the gang and operating to prevent movement of the latter about its vertical axis at all times in the operation of the cultivator.

12. A cultivator having a frame, a gang of cultivating devices whose forward end is pivotally connected to the frame, a longitudinally movable lifting member connected to the gang of cultivating devices and mechanism to raise and lower the lifting member and impart corresponding movement to the gang of cultivating devices about the pivot at the forward end of the latter; said mechanism including an actuating lever, means for holding said lever in different set positions, a rockable member, one of whose ends has connection with one end of said lever, a pivoted element carried by the other end of said rockable member and relatively to which the lifting member has longitudinal movement and means arranged to exert yielding force upon the lifting member and to co-act with said pivoted element in transmitting movement between the rocking member and said lifting member.

13. A cultivator according to claim 12 in which the connection between the actuating lever and one end of the rockable member includes a rock shaft to which said member is attached and a link intermediate the lever and said rock shaft, and in which also the yieldable means includes a pair of springs respectively mounted upon the upper and lower ends of the lifting member and the pivoted element is a trunnion ring through which said lifting member extends loosely and which is mounted between and operatively engaged by the corresponding ends of said springs.

14. A cultivator including a frame; a series of gangs of cultivating devices having pivotal connection at their front ends with the frame and relatively arranged to provide a plurality of pairs whereof the gangs of each pair are positioned simultaneously to cultivate opposite sides of the same crop row; a transverse rock shaft carried by the frame; a first and a second sleeve, each having a pair of lifting arms projecting therefrom and being respectively fixed to and loose upon said rock shaft; spring tensioned lifting rods respectively operated by said lifting arms to raise or lower the corresponding gangs of cultivating devices; a first and a second crank arm, respectively connected to the rock shaft and loose sleeve; a pair of levers and operating connections between said levers and the respective crank arms; said connections including a slide to which one of the levers is pivoted, elements coacting to hold said lever in set position relatively to the slide, a link connecting said lever with the crank arm of the loose sleeve, a link connected to the crank arm which is fixed to the rock shaft and with which the other lever is pivotally connected, an arm connecting the slide with the latter crank arm, and co-acting means to hold the last mentioned lever in set position.

15. A cultivator according to claim 12 in which the connection between the forward end of the gang of cultivating devices and frame comprises a horizontally arranged supporting element rigidly connected to the frame, a sleeve mounted to have movement about a horizontal axis upon said supporting element and provided with a crank arm which extends therefrom, a member movable unitarily with said sleeve and provided with a lug to which the forward end of the gang is connected and a spring whose lower end is connected to said crank arm and whose upper end is connected to the forward end of the frame.

16. A cultivator according to claim 12 in which the connection between the forward end of the gang of cultivating devices and frame comprises a horizontally arranged supporting element rigidly connected to the frame, a sleeve mounted to have movement about a horizontal axis upon said supporting element and provided with a crank arm which extends therefrom, a member movable unitarily with said sleeve and provided with a lug to which the forward end of the gang is connected and a spring whose lower end is connected to said crank arm and whose upper end is connected to the forward end of the frame and in which also the yieldable means includes a pair of springs respectively mounted upon the upper and lower ends of the lifting member and which coact with the first mentioned spring in imparting floating action to the gang of cultivating devices.

17. A cultivator comprising a frame having transverse horizontal members spaced from each other and rigidly connected to the front end of the frame, a pair of longitudinally extending cultivator beams having gangs of cultivating devices thereon, sleeve rotatably mounted upon said transverse members respectively and provided with crank arms, springs whose opposite ends are connected to said frame and crank arms, means fixedly secured to the respective sleeves to have rotative movement therewith and provided with lugs, said cultivator beams respectively having their forward ends connected to the said lugs to be movable unitarily therewith about the transverse horizontal members as the axis of such movement, lifting rods connected to the rearward ends of the cultivator beams, upper and lower springs mounted on each of said lifting rods, the latter having abutments for the upper ends of the upper springs and the lower ends of the lower springs, trunnion rings mounted between the confronting ends of the respective pairs of springs and serving as abutments for the lower ends of the upper springs and upper ends of the lower springs, and means operable to adjust said beams to different positions in accord with the selected depth of penetration of the cultivating devices, the said trunnion rings, abutments and springs coacting to impart floating action to said beams and cultivating devices in all positions of adjustment of the latter, said means including rockable members to which said trunnion rings are respectively pivoted and means for rocking said members, the lifting rods being bodily movable through said trunnion rings.

18. A cultivator including a frame, a longitudinal member having cultivating devices thereon, means for connecting the forward end of the longitudinal member to the frame for pivotal movement in a vertical plane, a supporting spring interposed between the forward end of the member and the frame and tending to raise the cultivating devices when the latter are in operation and means for holding the cultivating devices in operative position or in raised inoperative position and including a lifting lever and opposed springs, connected to the lever and longitudinal member, one spring being in position to cushion an upward movement of the longitudinal member and the other in position to cushion a downward movement of the longitudinal member.

19. A cultivator including a frame, a plurality of longitudinal members, each having cultivating devices thereon, means for connecting the forward ends of the longitudinal members to the frame for pivotal movement in a vertical plane, mechanism for adjusting said members about the said axis to vary the ground penetration depth of the cultivator devices, said mechanism comprising supporting springs interposed between the respective forward ends of the members and the frame and tending to raise the cultivating devices when the latter are in operation, lever operated rocker arms, means for connecting the rocker arms and longitudinal members for holding the cultivating devices in operative position or raised inoperative position and including opposed springs for respectively receiving and reacting against upward and downward movements of the longitudinal member.

20. A cultivator including a frame, a longitudinal member having cultivating devices thereon, means for connecting the forward end of the horizontal member to the frame for pivotal movement in a vertical plane, spring counterbalancing means connected between the horizontal member and frame for exerting a gravity-overcoming action on the horizontal member in an inoperative position and in an operative position, means for holding the cultivating devices in operative position or in raised inoperative position and including a lifting lever a rod connected to the horizontal member, a pair of opposed springs about the rod and means between the opposed springs and pivoted to the lifting lever.

21. A cultivator including a frame, a gang of cultivating devices secured to the frame, means for adjustably securing the cultivating devices in any one of a plurality of positions transversely of the frame, means for pivoting the gang for movement in a vertical plane, a downwardly inclined hobble bar pivotally mounted on the frame for movement about a transverse axis, and a loose connection between the gang and the lower portion of the hobble bar.

22. A cultivator including a frame, a gang of cultivating devices secured to the frame, means for adjustably securing the cultivating devices in any one of a plurality of positions transversely of the frame, means for pivoting the gang for movement in a vertical plane, a downwardly inclined hobble bar pivotally mounted on the frame for movement about a transverse axis, and means operatively related to the pivoted end of the hobble bar for securing the bar in any one of a plurality of adjusted positions without interfering with its pivotal movement.

23. A cultivator including a frame, a gang of cultivating devices secured to the frame, means for adjustably securing the forward end of the gang to the frame in any one of a plurality of transverse positions, means for pivoting the gang for movement in a vertical plane, the frame having a transverse member above the gang, a downwardly inclined hobble bar, means for securing the hobble bar on the transverse member in any one of a plurality of positions without interfering with its pivotal movement and a loose connection between the gang and the lower portion of the hobble bar.

24. A cultivator including a frame, a gang of cultivating devices secured to the frame, means for adjustably securing the forward end of the gang to the frame in any one of a plurality of transverse positions, means for pivoting the gang for movement in a vertical plane, the frame having a cylindrical transverse member above the gang, a split sleeve on the transverse member, an adjustable member on and secured to the transverse member and in the split of the sleeve to prevent undesired movement of the sleeve the sleeve having a socket, a downwardly inclined hobble bar in the socket and a loose connection between the hobble bar and the cultivating devices.

25. A cultivator including a frame, a plurality of gangs of cultivating devices having pivotal connection at their front ends with the frame, spring-tensioned lifting rods for the respective gangs, a longitudinal movable link having forward and rearward relatively slidable members, operating connections between the forward link-members and the lifting rods, the rearward link-member being adapted for connection to a tractor-operated power lift mechanism, a tension regulating and depth adjusting lever pivoted to one of said link members, a link connecting said lever with the other link member, and cooperating holding elements respectively connected to said lever and a link member and operative when in holding engagement with each other to cause movement of the link members as a unit and when disengaged from each other to cause one of said members to move relatively to the other, when said lever is operated.

CHARLES T. RAY.